United States Patent [19]

Elliott

[11] 4,037,613

[45] July 26, 1977

[54] WASHER FOR BEARING RACES

[75] Inventor: Jack P. Elliott, Amherst, N.Y.

[73] Assignee: J. P. Elliott Associates, Inc., Buffalo, N.Y.

[21] Appl. No.: 610,934

[22] Filed: Sept. 8, 1975

[51] Int. Cl.[2] .......................... B08B 3/02; B08B 9/00; B60S 3/00

[52] U.S. Cl. ...................................... 134/83; 134/49; 134/123; 134/134; 118/314; 118/318; 221/295

[58] Field of Search ................. 134/83, 123, 134, 165, 134/82, 49, 133; 118/314, 316, 318, 320; 221/289, 294–295

[56] References Cited

U.S. PATENT DOCUMENTS

| | | | |
|---|---|---|---|
| 1,411,380 | 4/1922 | Roof | 134/83 X |
| 1,543,345 | 6/1925 | Thompson | 134/165 X |
| 2,114,974 | 4/1938 | Camerota | 134/134 X |
| 2,229,605 | 1/1941 | Snyder et al. | 134/82 UX |
| 2,622,608 | 12/1952 | Moore et al. | 134/165 X |
| 2,684,073 | 7/1954 | Gregg | 134/134 X |
| 3,098,494 | 7/1963 | Drexinger et al. | 134/83 X |
| 3,464,589 | 9/1969 | Oden | 221/295 |

FOREIGN PATENT DOCUMENTS

| | | | |
|---|---|---|---|
| 455,394 | 2/1970 | Japan | 118/316 |
| 282,887 | 5/1971 | U.S.S.R. | 134/83 |

*Primary Examiner*—Robert L. Bleutge

*Attorney, Agent, or Firm*—Christel & Bean

[57] ABSTRACT

A bearing washing machine is provided having cleaning stages through which disassembled bearing races are continuously processed. The machine includes a pair of parallel support tracks selectively spaced from one another which are disposed at an angle to the horizontal. The tracks support opposite side edges of a bearing race which rolls down the inclination provided by the tracks. Cleaning nozzles are disposed adjacent to the tracks to provide cleaning stages through which each bearing race passes. The nozzles at the upper end of the tracks provide a washing solution to impinge against each bearing race while nozzles at the lower end of the tracks provide air for blowing off washing solution and drying the races. An overhead guide rail engages one of the upper edges of each race to maintain it in aligned rolling contact with the support tracks. The tracks and guide rail are selectively spaced from each other to accommodate races of various thicknesses or widths and of various diameters. Feeding and receiving apparatus is provided for respectively and cooperatively feeding bearing races onto the support tracks and for receiving and conveying away from the lower end of the support tracks each bearing race upon completion of the cleaning process.

9 Claims, 13 Drawing Figures

WASHER FOR BEARING RACES

BACKGROUND OF THE INVENTION

This invention relates generally to bearing washing machines, and more particularly to a bearing washing machine for cleaning or washing disassembled bearing races. Specifically, the washing machine is capable of receiving and processing bearing races on a continuous basis and includes a sequence of washing and blowoff/drying sections or stages through which the bearing races systematically pass.

The present invention is particularly adapted for those situations in which a substantial number of disassembled bearing races of uniform dimension are to be washed and cleaned. In such a situation it is highly desirable to minimize the handling of the individual races and to minimize the amount of attention required by a user of a washing device thereof. One of the critical problems encountered in the prior art of bearing washing machines, and machines for bearing races specifically, has been the inability to continuously process a quantity of bearing races without interruption. More specifically, prior art devices have necessitated placing a limited quantity of races in a washing device which would then be subjected to a washing operation. Such loading and unloading of a washing device necessarily is cumbersome when a user thereof must wait for completion of one "load" before a new load of uncleaned bearings can be cleaned. The above problems have been considered in U.S. patent application Ser. No. 506,311 of Jack P. Elliott filed Sept. 16, 1974 and assigned to the assignee of the present invention, in a bearing washing machine described therein for processing, in a continuous manner, assembled inner and outer bearing races of uniform dimension during any one run of the machine. In contrast, the present invention is directed to a continuously operable washing machine adapted to process either inner or outer bearing races in disassembled form and avoid the problems of the prior art.

SUMMARY OF THE INVENTION

Accordingly, one object of the present invention is to provide a new and improved bearing washing machine for cleaning either inner or outer bearing races which minimizes the manual labor required for operation of such a washing machine and corresponding cleaning of the bearing races.

Another object of the present invention is to provide an improved bearing race washing machine capable of receiving and processing bearing races on a continuous, uninterrupted basis.

A further object of the present invention is to provide the aforesaid bearing race washing machine with the capability of processing bearing races of varying diameters and varying thicknesses or widths.

A still further object of the present invention is to provide a washing machine which will receive uncleaned bearing races and perform a plurality of cleaning operations resulting in cleaned races which do not require any further cleaning procedure and which are dryed to a desired degree.

Yet another object of the present invention is to provide a washing machine for bearing races which includes a highly flexible and adjustable conveyance apparatus for conveying bearing races through cleaning stages and wherein the conveyance of such races can be synchronized with, for example, bearing assembly apparatus which would receive the bearing races subsequent to their cleaning.

In summary, the present invention provides a bearing race washing machine having a housing and two pair of inclined support tracks for providing rolling surfaces along which two batches or sets of bearing races can be simultaneously or concurrently washed and cleaned. The track means are inclined to urge the bearing races to roll past a plurality of cleaning nozzles. The cleaning nozzles at the upper portion of each pair of support tracks are provided with washing fluid wherein such washing fluid issues from the nozzles in multiple directions. This results in a highly effective impingement of the washing fluid against each of the bearing races which in turn results in a more efficient washing operation. Adjacent to the lower end of each pair of support tracks are disposed a plurality of additional cleaning nozzles which are provided with blow/off and drying air to impinge against the washed races. In addition, support track mounting means are provided for each pair of support tracks which are so mounted and connected to support track mounting means linkage that each respective pair of tracks may be selectively spaced apart in a facilitated manner to receive bearing races of different thickness or widths in rolling contact therewith. Furthermore, an overhead guide rail is provided over each pair of support tracks to contact an upper edge of the bearing race to retain such races in aligned rolling contact with the support tracks therebeneath. Each guide rail also includes approporiate adjustment linkage for accommodating bearing races of different thicknesses or widths as well as races having various diameters. Each pair of support tracks further includes similar feeding means and receiving means so that each track set may concurrently process bearing races in a controlled manner. Each feeding means operates to selectively control the duration each race means is subjected to a washing operation while each receiving means operates to selectively control the duration each race means is subjected to a drying operation.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

DETAILED DESCRIPTION OF A PREFERRED EMBODIMENT

Figure 1:
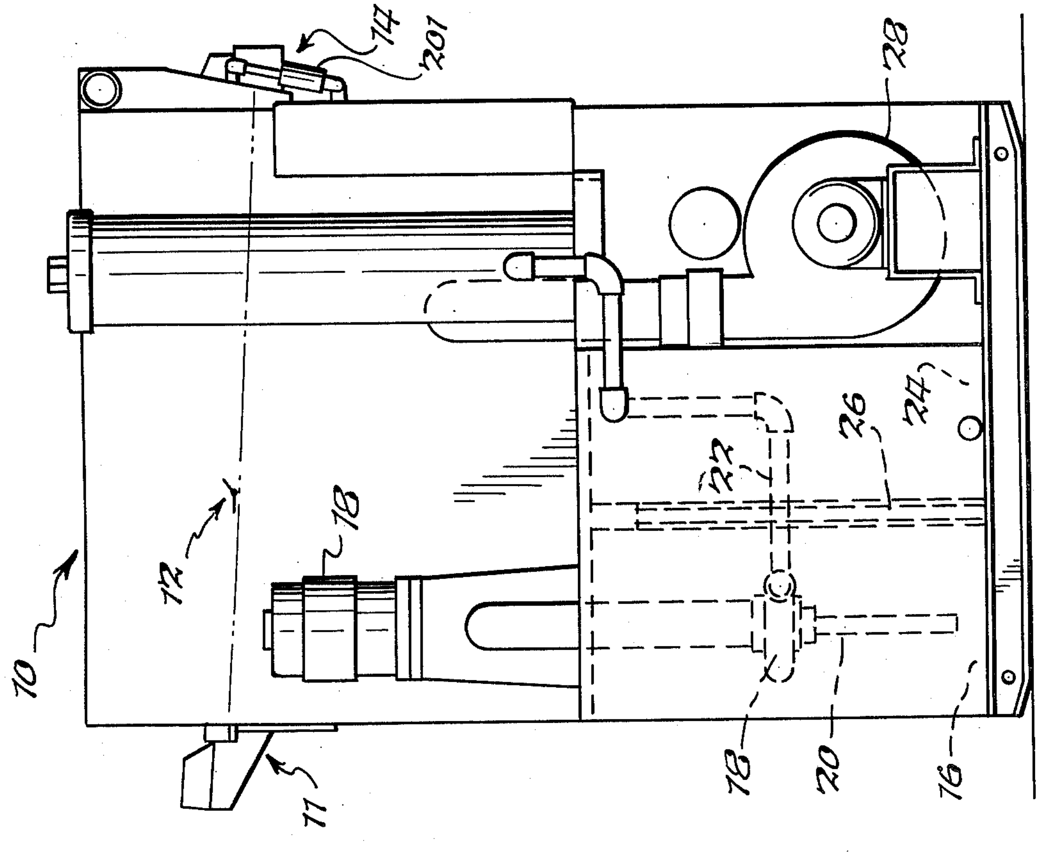
FIG. 1 is a rear side elevational view of a bearing washing machine as embodied in this invention.

Referring now in detail to the illustrative embodiment depicted in the accompanying drawings, there is shown in FIG. 1 a bearing race washing machine having a housing generally designated 10 and a guide means 11 attached thereto at an entrance end which leads to an internally disposed feeding means 12 and receiving means 14 attached at an exit end of the machine. The housing further includes a washing fluid sump area 16 from which washing fluid is drawn by washing fluid pump means 18 through pipe 20. The washing fluid is conveyed to cleaning or washing fluid nozzles to be more fully described hereinbelow through conduit 22. In addition, washing fluid having been sprayed onto the bearing races for cleaning thereof is drained into drainage basin areas 24 and is filtered through screen means 26 into sump area 16 for subsequent reuse in the washing cycle. Additionally, a blower and drive motor means therefor 28 is mounted on housing 10 for providing an air flow to some of the cleaning nozzles which also will be more fully described hereinbelow.

Figure 2:
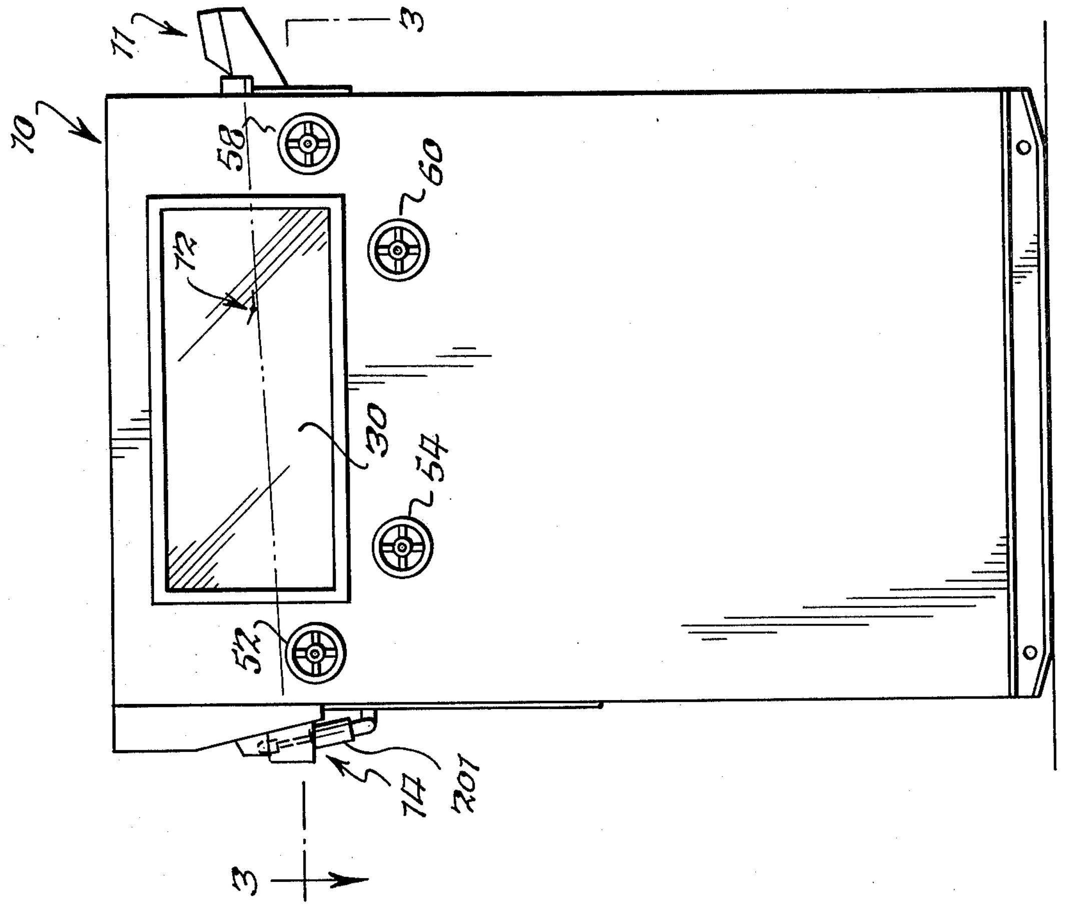
FIG. 2 is a front side elevational view showing the reverse side to that of FIG. 1.
Figure 6:
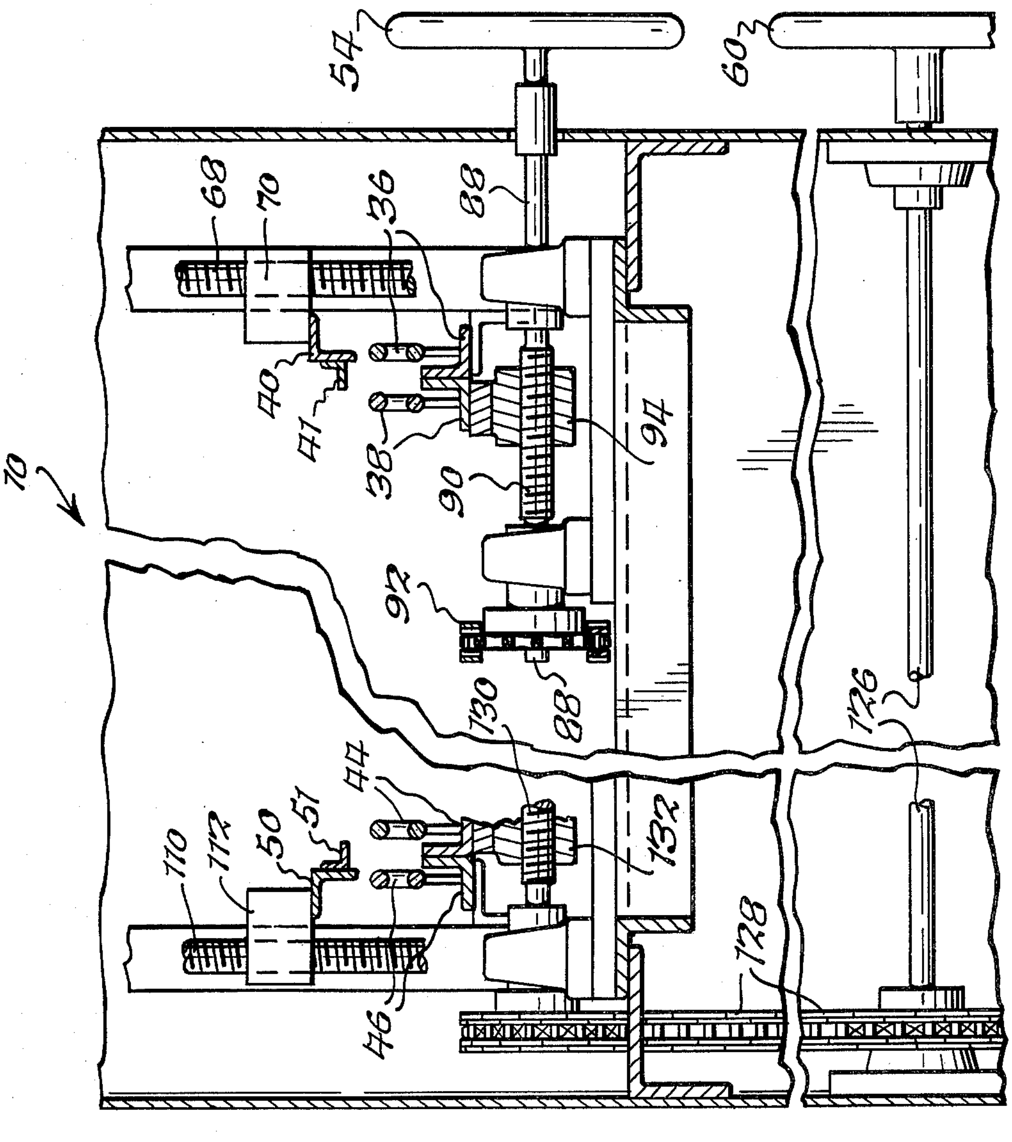
FIG. 6 is a fragmentary, vertical view, in broken form, of further adjustment linkage for both pairs of support tracks as taken about on line 6—6 of FIG. 3 and wherein the upper righthand portion of FIG. 6 shows in addition the connection of handwheel 54.

Turning now to FIG. 2 of the drawings, a window 30 is provided through which an operator may view bearing across passing along the support tracks extending between the delivery guide means and receiving means 11 and 14 respectively. Four hand wheels are provided, which for purposes of further description will be called, the front side of the housing of the washing machine, for adjusting the support tracks and guide rails therein to selected degrees of spacing for accomodating different batches of bearing races having different dimensions. The pair of support tracks adjacent to the side shown in FIG. 1 will be called the far side tracks while the pair of support tracks adjacent to window 30 and the hand wheels shown in FIG. 2 will be called the front or near side tracks. As best seen in FIG. 6, the near side support tracks adjacent to the front of the housing are designated 36 and 38 which in turn have the corresponding near side guide rail 40 disposed thereabove. Similarly, the far side support tracks adjacent to the backside of the housing 10 are designated 44 and 46 with a corresponding guide rail 50 disposed thereabove.

As further viewed in FIG. 2, handwheel 52 provides vertical adjustment to guide rail 40. Handwheel 54 provides horizontal separation to inner, near side support track 38 with respect to support track 36, the latter being fixed in a permanent disposition with respect to the frame of the washing machine. Handwheel 58 in turn provides selected vertical separation of the outer, far side guide rail 50 from the lower support tracks 44 and 46 correspondingly disposed therebeneath. Lastly, handwheel 60 provides horizontal spacing to inner, far side support track 44 from outer, far side support track 46, the latter correspondingly fixed in a permanent position with respect to the frame of the bearing machine as is outer, near side support track 36 previously referred to hereinabove. The mechanical linkage by which all of the aforesaid handwheels provide their respective adjustments will now be more fully described.

Figures 3, 4:
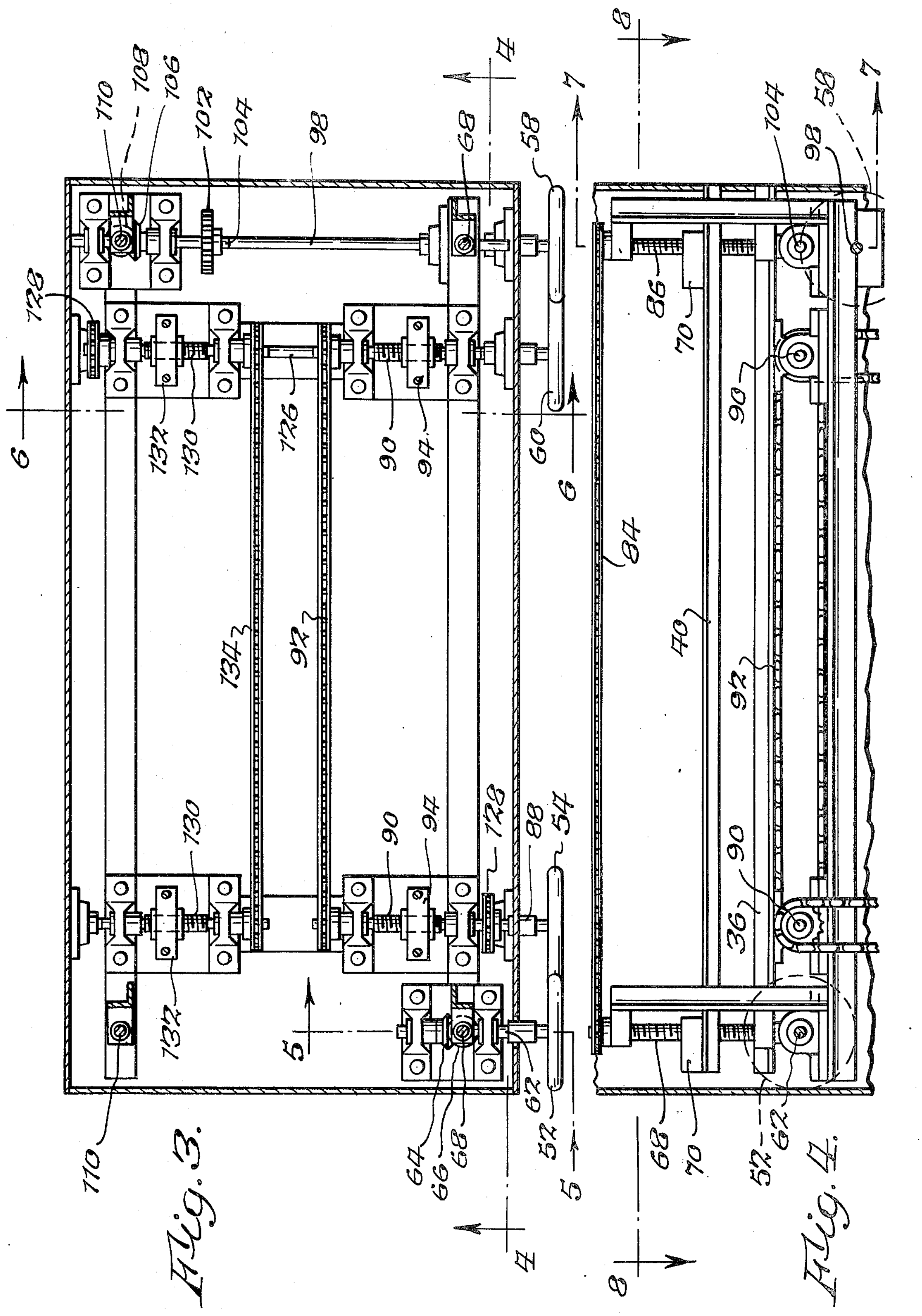
FIG. 3 is a sectional top plan view of the adjustment linkage for the support tracks as taken about on line 3—3 of FIG. 2.
FIG. 4 is a fragmentary, side elevational view in section of the support track adjustment linkage as taken about on line 4—4 of FIG. 3.
Figure 5:
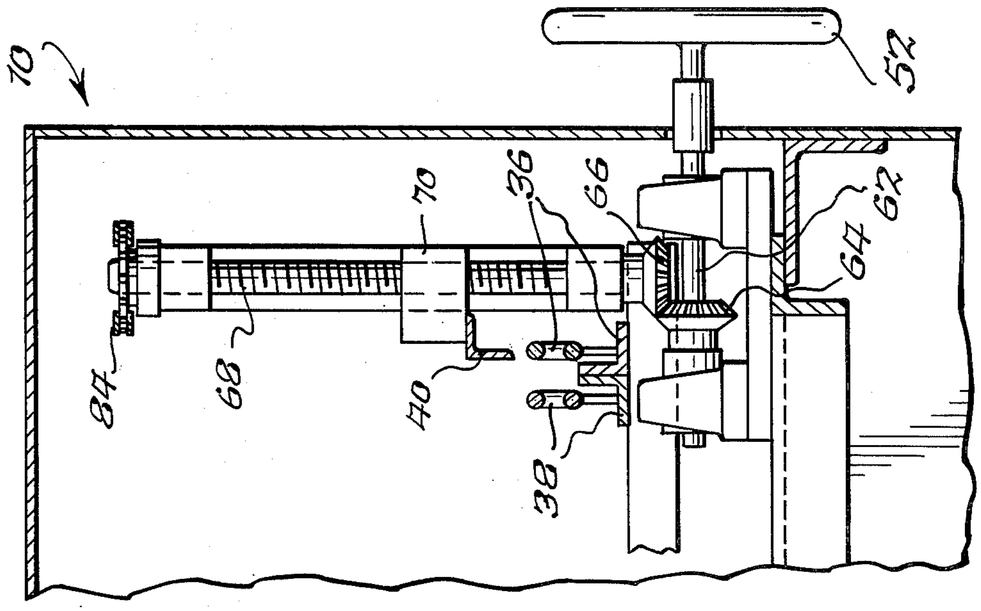
FIG. 5 is a fragmentary, vertical end view in section of one pair of support tracks and their mounting means as taken about on line 5—5 of FIG. 3.

Turning to FIG. 3 handwheel 52 is connected to shaft 62 which includes a bevel gear 64 mounted for rotation therewith as seen in FIG. 5. The bevel gear 64 mates with bevel gear 66 to turn a threaded shaft 68 which is internally received within a nut type mounting block 70 on which the near side guide rail 40 is mounted. Through rotation of wheel 52, corresponding vertical adjustment can be provided to the mounting means 70 and guide rail 40.

As further seen in FIG. 4, the threaded shaft 68 driven by handwheel 52 includes a gear and driven chain 84 at the top thereof. The chain 84 drivingly connects the top of threaded shaft 86 which in turn vertically adjusts an internally threaded nut type of mounting means similar to mount 70 which supports the entrance end of guide rail 40. In this manner, both ends of guide rail 40 are affirmatively adjusted through rotation of handwheel 52 and the interconnection of mounting nuts 70 by chain 84.

The operation of handwheel 54 for horizontal adjustment of near side support tracks 38 can best be seen by viewing FIG. 3 and the right portion of FIG. 6 together. As seen in FIG. 3, handwheel 54 is attached to shaft 88 which in turn drives a threaded portion 90 thereon and a drive chain 92 which is in driving connection with the geared end of shaft 88. A support track mounting means 94 is carried by the threaded support track mounting means shaft portion 90 so that the support track 38 affixed to the mounting means 94 may be selectively spaced in a horizontal direction from the fixed position of support track 36. Furthermore, the chain 92, or more specifically, the support track mounting means linkage is also connected to another threaded support track mounting means shaft 90 at its other end which in turn drives another support track mounting means similar to 94 which is in turn supportably connected to the entrance end of support track 38. In this manner, rotation of handwheel 54 provides affirmative mechanical adjustment to the horizontal spacing of support track 38 at both of its ends through the support track mounting means linkage or drive chain 92.

Figure 7:
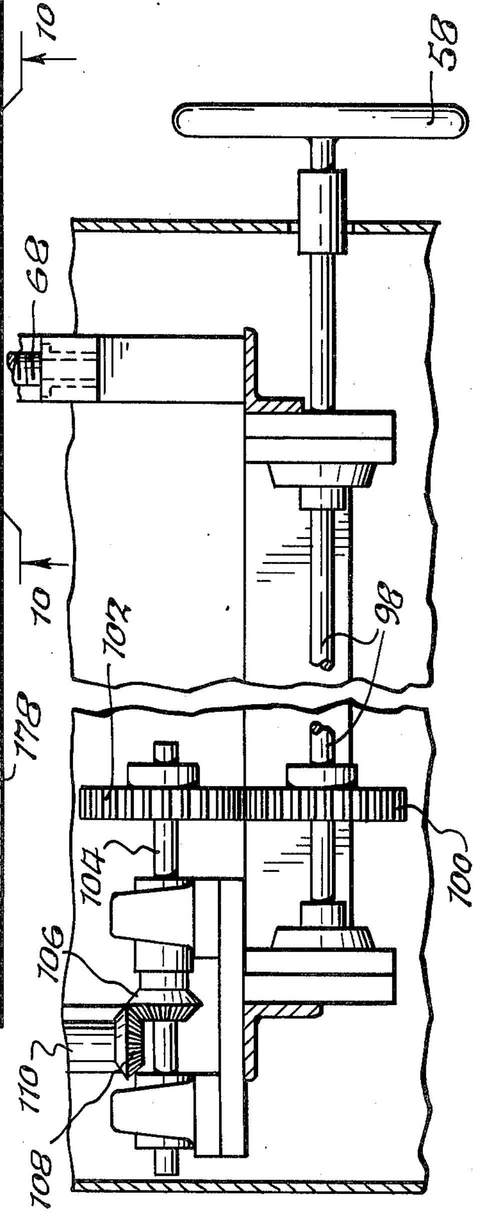
FIG. 7 is a fragmentary vertical view in section showing adjustment linkage for a guide rail as taken about on line 7—7 of FIG. 4.

Turning now to the linkage driven by handwheel 58, attention should be directed to FIGS. 3, 4 and 7 taken together. As shown in FIG. 3, handwheel 58 drives a journalled shaft 98 which extends beneath both pairs of support tracks. The far side end of shaft 98 includes a spur gear 100 which in turn drives spur gear 102. Spur gear 102 drives shaft 104 and bevel gear 106 carried thereon. Bevel gear 106 mates with bevel gear 108 to drive a vertically disposed shaft 110 connected thereto as also seen in top sectional view in FIG. 3. A seen in FIG. 6, shaft 110 includes a threaded portion which in turn carries an internally threaded nut type mount 112 which is similar to mount 70 and is seen in the left portion of FIG. 6. The far side guide rail 50 is attached to mount 112 and is vertically adjusted through operation thereof. The top of shaft 110 includes a gear and chain linkage similar to chain 84 for affirmatively driving a mounting means for the exit end of guide rail 50 so that both ends of guide rail 50 are affirmatively adjusted through an interconnecting chain linkage which is activated by rotation of handwheel 58.

The final adjustment linkage to be described is with respect to handwheel 60. Attention should be directed to FIGS.2, 3 and 6. As shown in FIG. 6, handwheel 60 is drivingly connected to shaft 126 and the far side end of shaft 126 includes a driving gear in driving connection with chain 128 which in turn drives a threaded support track mounting means shaft 130 as seen in FIGS. 3 and 6. The shaft 130 in turn has a support track mounting means 132 mounted thereon which has inner, far side support track 44 affixed thereto. By means of this arrangement, support track 44 can be selectively spaced from support track 46 through selective horizontal positioning of mounting means 132 by adjustment of handwheel 60 and the support track mounting means linkage or drive chain 128. As further seen in FIG. 3, shaft 126 extending from handwheel 60 drives additional support track mounting means linkage or chain 134 which in turn drives a threaded support track mounting means shaft 130 on which is disposed a mounting means similar to 132 shown in FIG. 6 and which provides supported, horizontal adjustment to the exit end of support track 44. Therefore, in a manner similar to the horizontal adjustment provided to support track 38 by handwheel 54, rotation of handwheel 60 provides affirmative horizontal adjustment to both ends of support track 44 for selectively spacing the same from support track 46 while the latter is in a fixed position with respect to the frame of the washing machine.

Figure 8:
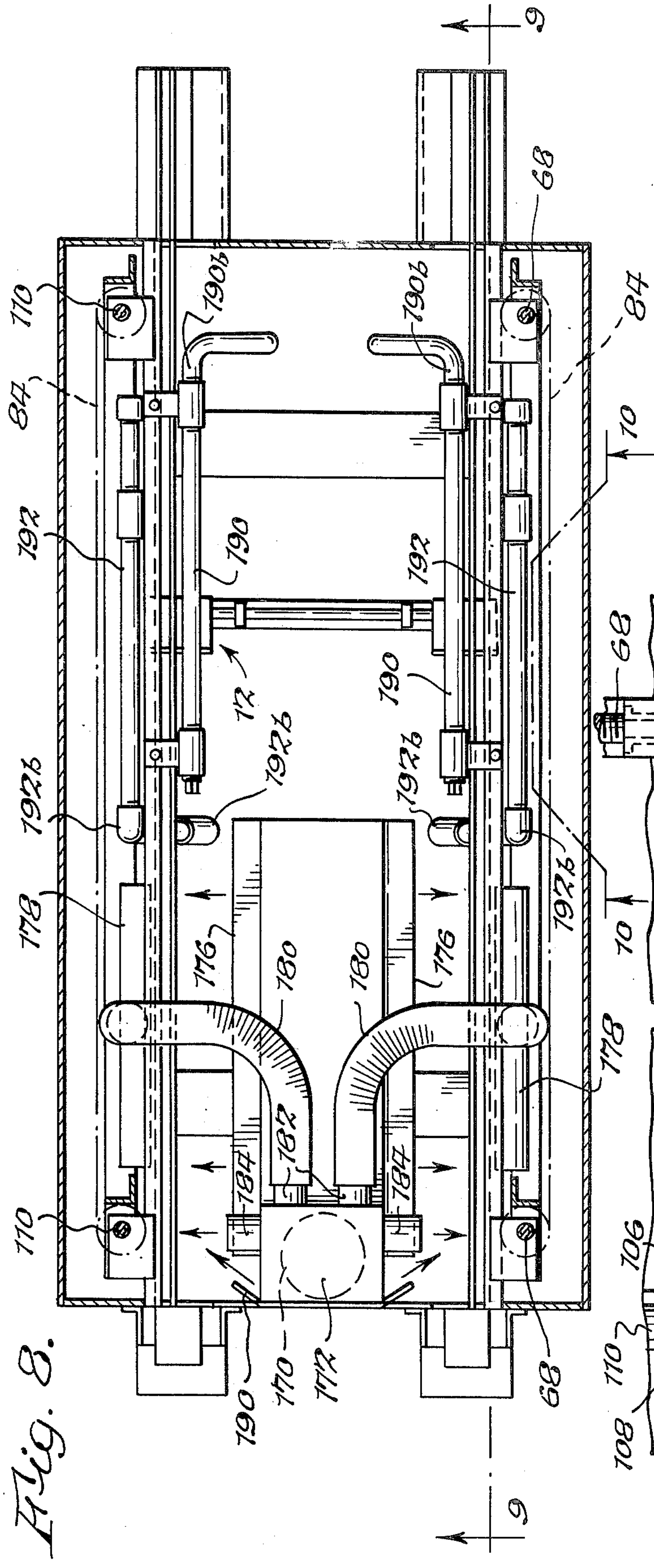
FIG. 8 is a sectional, top plan view of the cleaning nozzles as taken about on line 8—8 of FIG. 4.
Figure 11:
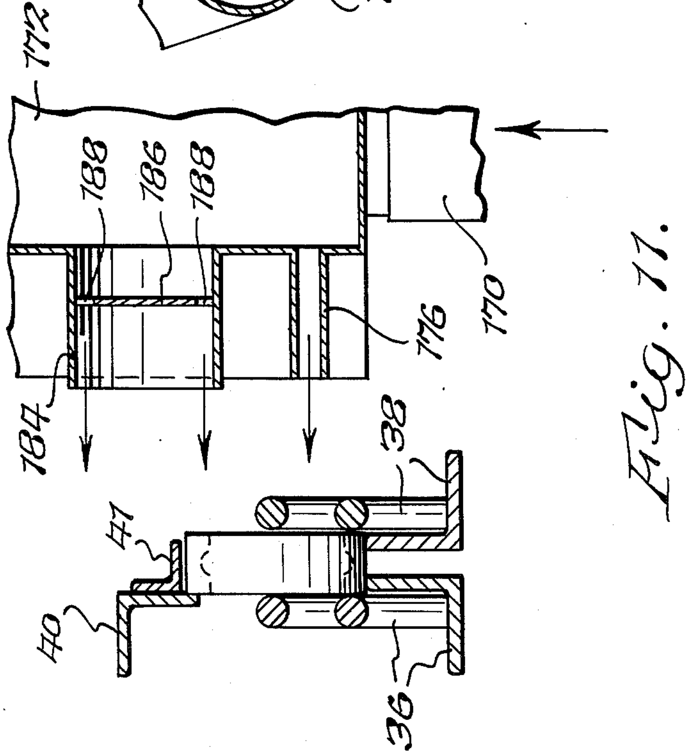
FIG. 11 is an isolated view with portions broken away of a pair of the nozzle structure for the blow off and drying air utilized in the present invention as taken about on line 11—11 on FIG. 9.

As viewed in FIG. 8, the far side and near side support track and guide rail assemblies are substantially identical. As viewed further in FIGS. 8 and 11, appropriately pressurized air is fed upwardly through pipe 170 to a plenum chamber 172 from which four different drying air nozzles or openings are fed. As further seen in the aforesaid figures, the plenum chamber 172 includes a tapered appendage extending towards the entrance end of the machine as clearly seen in FIG. 9 in sideview and indicated as 174. The appendage or extension 174 includes a slightly inclined nozzle 176 on each of its sides which is vertically aligned with the inclination of each of the pairs of support tracks so as to direct pressurized drying air against the inner planar side of the race means maintained within the support track structures. In addition, a tubular air nozzle 178 is provided adjacent to the outer side of each support track pair and is disposed substantially opposite to the air nozzle 176. Tubular air pipes 178 which include appropriate drill through holes therein for directly air towards the adjacent side of bearing races are fed by flexible hoses 180 which are connected to extension portions 182 of the plenum chamber 172. A third source or nozzle structure for directing drying air towards bearing races maintained in the support tracks are the doughnut shaped nozzles 184 extending from both sides of the plenum chamber 172. As seen in FIG. 11, each nozzle 184 includes a tubular outer extension attached to plenum 172 and further includes a concentrically disposed baffle means 186 which defines an annular opening 188 with respect to portion 184. A fourth source of drying air is directed towards the bearing races on both support tracks from vertical slots in the end of each sidewall portion of the plenum chamber 172. Although the slots are not shown in FIG. 8 the air guide means 190 are provided to direct the air flowing from such vertical slots in a direction as indicated by the arrows in FIG. 8.

Figure 9:
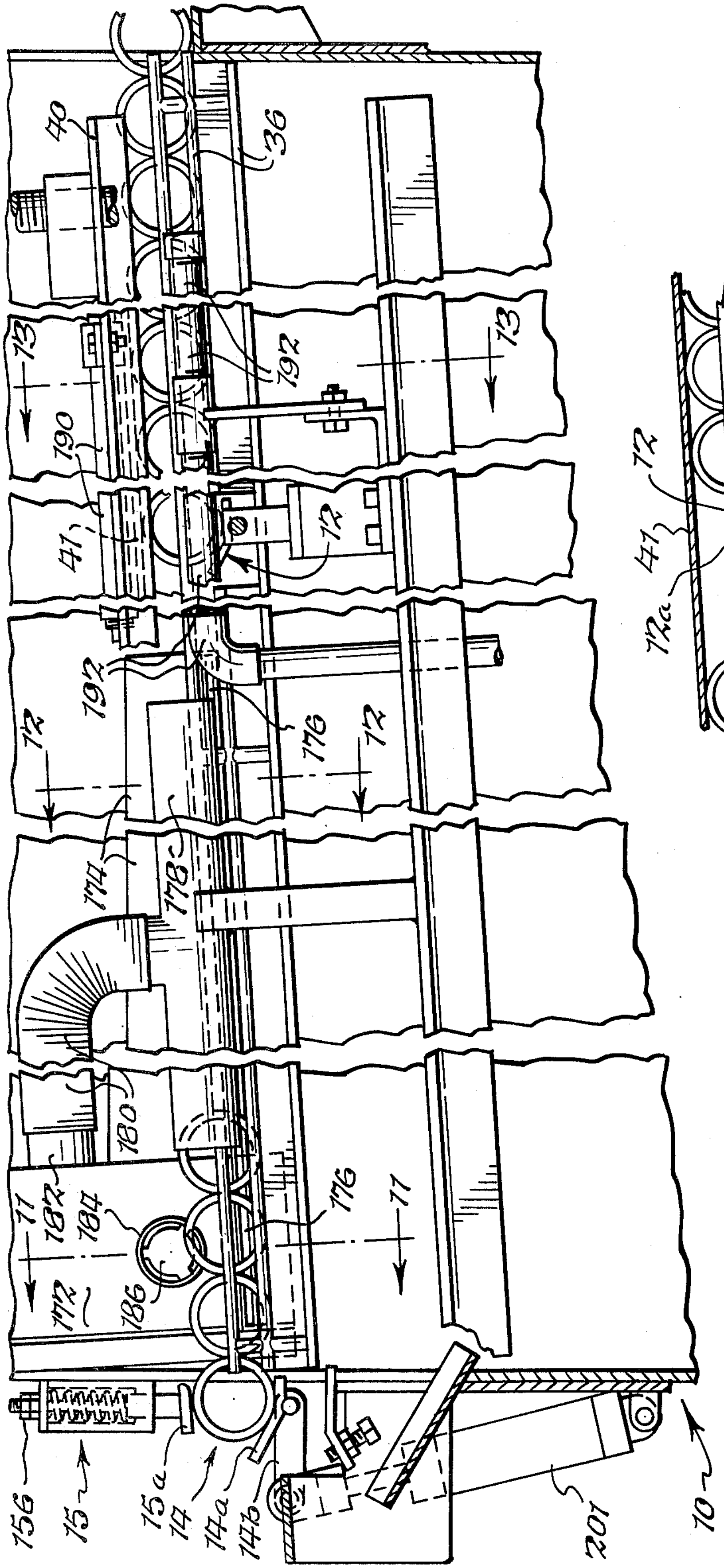
FIG. 9 is a fragmentary, plan elevational view in section of the support tracks and the feeding and receiving means therefor as taken about on line 9—9 of FIG. 8.
Figure 13:
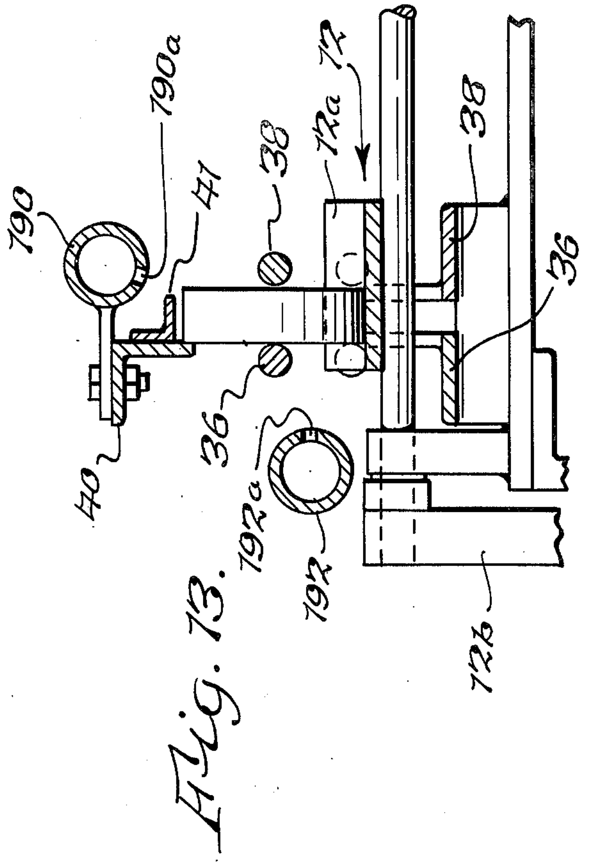
FIG. 13 is a fragmentary, isolated view partially in section of a portion of the cleaning nozzle structure through which washing fluid issues.

With reference to FIG. 8, 9 and 13 taken together, pressurized washing solution is provided to the pipes 190 and to the pipes 192 by the pump means 18. As shown in detail in FIG. 13, the pipes 192 on the outer side of the support tracks are rigidly mounted to the frame of the apparatus. Pipes 192 have through drill holes **192*a* through which washing solution passes to impinge against the planar side surfaces of the bearing race means. As shown in FIG. 8, the pipes 192 are fed with washing solution from their relatively lower ends 192*b*. In addition, the pipes 190 are rigidly mounted on the overhead guide rail 40 and similarly on overhead guide rail 50. The pipes 190 also have through drill holes 190*a*** and are fed from the aforesaid pump means at the relatively higher ends 190*b* through use of flexible couplings so that the pipes 190 may be vertically positioned through movement of the guide rails referred to as supporting the pipes 190. Accordingly, as shown and described, washing fluid issues through the nozzles or holes **190*a* and 192*a*** so as to fully subject each bearing race to a spray of washing solution as each bearing race rolls downwardly along the inclined support tracks.

Figure 10:
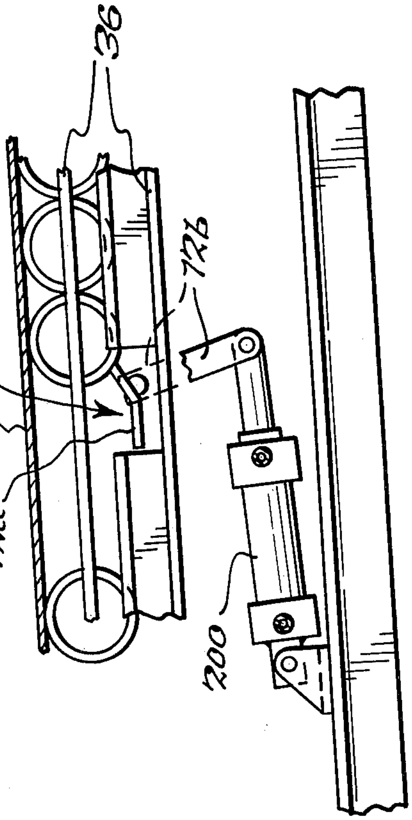
FIG. 10 is an isolated view with portions broken away of the feeding means associated with each pair of support tracks in the present invention as taken about on line 10—10 of FIG. 8.
Figure 12:
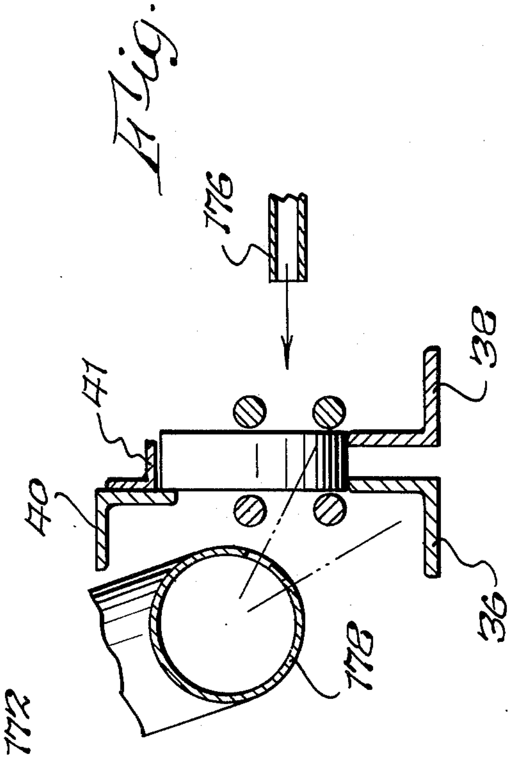
FIG. 12 is an isolated view with portions broken away of additional nozzle structure for the blowoff and drying air utilized in the present invention as taken about on line 12—12 of FIG. 9.

Turning to FIGS. 9 and 10, a portion of the guide rail means 11 is shown in fragmentary form for guiding bearing races onto each of the pair of support tracks in a continuous manner. In addition, a feeding means or mechanism 12 is shown at a point on each pair of the support tracks near the lower ends of the washing fluid pipes 190 and 192. The feeding mechanism 12 includes a pivoted cradle means **12*a* which is pivoted by pivot arm 12*b* which is in turn driven by a pneumatic cylinder 200. As shown in FIG. 10, the cradle 12*a* can be made to reciprocably move between a position shown therein wherein a bearing race means will be restricted from further movement down the support tracks by operation of the vertical positioning of angle bar 41 which is affixed to and therefore vertically positioned by the positioning of guide rail 40 as shown in FIGS. 11–13. The cradle 12*a* also has a second position, clockwise from that shown in FIG. 10, where one bearing race will be received so that when the cradle mades a counterclockwise movement to the position shown, one race will be set onto the support tracks which are in alignment therewith so that the bearing race will roll further down the support tracks and the next bearing will be prevented from moving onto the support tracks until another cycle of the cradle is completed. It is to be understood that the far side support tracks include a feeding means substantially identical to that shown in FIG. 10 and both feeding mechanisms could be operated off a single pneumatic cylinder such as 200 in FIG. 10 by placement of the cylinder in connection with multiple pivot arms 12*b*** through use of a common connecting rod.

The receiving means 14 is similar in operation to the feeding means 12 and includes a pivoted cradle **14*a* which is pivoted by arm 14*b* which is in turn driven by a pneumatic cylinder 201. As shown in FIG. 9, the pivoting of the cradle can be limited by set screws as obvious to one skilled in the art. The cradle means 14***a* can be made to reciprocably rotate between relative clockwise and counterclockwise positions to pass bearing races one at a time out of the washing apparatus.

Instead of the angle bar shown in FIG. 10 acting as a stop gate with respect to bearing races passing over the cradle means, receiving means 14 is provided with an adjustable, spring loaded stop gate 15. The stop gate 15 includes a spring loaded element 15*a* which may vertically reciprocate to a limited degree so as to retain bearing races against further movement when the cradle is in the counterclockwise position shown in FIG. 9. As shown, the vertical limitations on the movement of element 15*a* may be adjusted by the adjusting nuts 15*b* for races having different diameters within a certain range. For bearing races having diameters smaller or larger than the range provided by the adjustment of nuts 15*b,* the entire assembly 15 may be vertically positioned on the housing sidewall of the apparatus so as to provide course adjustment for such various diameters encountered.

In operation, it is anticipated that same size bearing races may be processed on both pairs of support tracks and corresponding guide rails or that simultaneously different size bearing races can be simultaneously processed on the different sets of support tracks through the ability of the support tracks and guide rails to accommodate races of different sizes. As an example, it might be desirable to process the inner races of similar bearings on one support track pair and the outer races of the same bearings on the second set of support tracks. Since both pairs of support tracks could be arranged to process races at the same rate, the inner and outer races could be received from the exit end of the support tracks and fed to bearing assembly machinery which could work in automated conjunction with the bearing race washer constituting the present invention.

For purposes of further description, the view in FIGS. 11–13 will be considered to be from the entrance end looking toward the exit end of support tracks 36 and 38 and corresponding guide rail 40 and overhead gate 41. Necessarily, the view and description with respect to the other set of support tracks and guide rail would be the same with the exception that the washing and drying nozzles, would be of opposite orientation to that shown. It is anticipated that the inclination of the support tracks and guide rails will be in the area of 6° with respect to the horizontal but this is not to be construed as a limitation in the operation of the present invention. As shown in FIG. 13 a bearing race could be fed to the support tracks and guide rail with the horizontal spacing between tracks 36 and 38 being set by the handwheel 54 and associated linkage as described hereinabove. This would result in movement of track 38 to either the left or right. With support track 36 fixed in a permanent position, the guide rail 40 must only be adjusted in a vertical direction so as to properly accommodate the diameter of the race. Such vertical adjustment of the guide rail is provided through handwheel 52 and the linkage associated therewith. As guide rail 40 is vertically adjusted, the vertical height of overhead gate rail 41 from the support tracks is also adjusted. As shown in FIG. 13, a race is passing by the washing nozzles 190*a* and 192*b* while in FIG. 12 a race is passing by the blowoff and drying nozzles of pipe 178 and nozzle 176. As shown in FIG. 11, as a bearing race rolls down towards the lower end of the support tracks it is subjected not only to the air stream issuing from nozzle 176 but also from the annular opening 188 and from the vertically disposed air stream issuing from the corner of plenum 172 and guided by vane 190.

It is to be further understood that the feeding means 12 and receiving means 14 do not necessarily have to operate in a synchronous manner although they could be adjusted to do so. Since both units operate in conjunction with timing and switching apparatus well known in the prior art, it should be understood that it very likely could be desirable to back races up on the support tracks through a delayed operation of feeding means 12 so that the races are subjected to prolonged washing action from pipes 190 and 192. It could however be determined that the bearing races need be subjected to drying air for a relatively shorter period of time than the aforesaid washing period and accordingly the receiving mechanism 14 could be set to release each bearing race means relatively sooner than races are processed by feeding means 12.

Regardless of the specific durations of time to which races are subjected to washing and drying it is a distinct feature of the present invention that such durations may be selected for any particular application. In addition, it has been found that the inclination of the support tracks discussed hereinabove is sufficient to move the bearing races therealong wherein such movement is not adversely affected by the washing and drying operation. An additional feature of the present invention resides in the fact that washing solution which tends to flow down the inclined flange portions of the support tracks may be subjected to a liquid dam effect created by the air flows issuing from nozzle 176 and pipe 178 so that drainage and recirculation of such washing fluid may be more effectively controlled.

From the foregoing, it is apparent that the objects of the present invention have been fully accomplished. As a result of this invention, a washing machine for bearing races is provided for washing and drying a quantity of such races is a continuous manner while minimizing the amount of labor once the machine has been put into operation.

Having thus described and illustrated a preferred embodiment of the invention, it will be understood that such description and illustration is by way of example only and such modifications and changes as may suggest themselves to those skilled in the art are intended to fall within the scope of the present invention as limited only by the appended claims.

I claim:

1. A bearing washing machine comprising:

a housing having track means for carrying bearing race means through a cleaning operation and said track means being substantially stationary during said cleaning operation wherein bearing race means roll along the longitudinal length of said track means, said track means comprising two spaced, substantially parallel support tracks providing a rolling support surface to each side of a bearing race means, support track mounting means on which said support tracks are correspondingly mounted, at least one of said support track mounting means being selectively spaced from the other so as to vary the spacing of said support tracks in order to provide a rolling support surface to race means of different thicknesses, guide rail means disposed above said support tracks, said guide rail means being selectively spaced from said support tracks in order to retain race means of different diameters in rolling contact with said support tracks, a plurality of threaded support track mounting means shafts on which said selectively spaced support track mounting means is respectively disposed and support track mounting means linkage for interconnecting and simultaneously adjusting said support track mounting means shafts so as to selectively vary the spacing between said support track mounting means, guide rail means linkage for adjusting the spacing of said guide rail means from said support tracks to positions of substantially equal spacing from said support tracks along the longitudinal length of said guide rail means, and a plurality of cleaning nozzles being disposed adjacent to said track means, said cleaning nozzles being disposed for directing a corresponding plurality of selected fluid flows onto the bearing race means for the cleaning thereof in successive stages upon rolling of each bearing race means past said cleaning nozzles.

2. A bearing washing machine as set forth in claim 1 wherein said pair of support tracks is disposed at a declination to the horizontal so that a bearing race means tends to roll down said track means by the force of gravity.

3. A bearing washing machine as set forth in claim 2 further including a feeding means and a receiving means for respectively feeding bearing race means to one end of said track means and for receiving race means at the other end of said track means, both of said feeding and receiving means being operable in a controlled manner and comprising pivoted cradle means capable of conveying one race means per pivoted cycle of operation.

4. A bearing washing machine as set forth in claim 3 having two pair of spaced, substantially parallel support tracks and each of said pair of tracks respectively having feeding means and receiving means associated therewith whereby bearing race means may be processed separately on each of said pair of track means and at substantially the same rates.

5. A bearing washing machine as set forth in claim 4 wherein washing fluid is provided to at least one of said cleaning nozzles associated with each pair of said support tracks with each said nozzle being disposed toward respective race means in a manner so that effective washing fluid impingement on each race means occurs and wherein drying air is provided to at least one of said cleaning nozzles associated with each pair of said support tracks with each of said nozzles being disposed toward respective race means in a manner so that effective drying air impingement on each race means occurs.

6. A bearing washing machine as set forth in claim 3 wherein washing fluid is provided to at least one of said cleaning nozzles with said nozzle being disposed toward the race means in a manner so that effective washing fluid impingement on each race means occurs and wherein drying air is provided to at least one of said cleaning nozzles with said nozzle being disposed toward the race means in a manner so that effective drying air impingement on each race means occurs.

7. A bearing washing machine as set forth in claim 3 wherein at least one of said pivoted cradle means underlies a spring loaded gate means, said gate means having a vertically reciprocable element spring biased into a relatively lower vertical position and being adjustably limited with respect to the relatively upper vertical movement thereof to insure that a race means will pass over said cradle means only upon pivoting of said cradle means.

8. A bearing washing machine as set forth in claim 1 wherein said support tracks are disposed at a declination to the horizontal so that a bearing race means tends to roll down said track means by the force of gravity.

9. A bearing washing machine as set forth in claim 8 wherein washing fluid is provided to at least one of said cleaning nozzles, with said nozzle being disposed toward the race means in a manner so that effective washing fluid impingement on each race means occurs and wherein drying air is provided to at least one of said cleaning nozzles with said nozzle being disposed toward the race means in a manner so that effective drying air impingement on each race means occurs.

* * * * *